United States Patent
Christel et al.

(10) Patent No.: US 7,683,156 B2
(45) Date of Patent: Mar. 23, 2010

(54) PRODUCTION OF A HIGH-MOLECULAR POLYCONDENSATE

(75) Inventors: Andreas Christel, Zuzwil (CH); Claudemiro Ferreira, Pocos de Caldes (BR)

(73) Assignee: Buhler AG, Uzwil (CH)

( * ) Notice: Subject to any disclaimer, the term of this patent is extended or adjusted under 35 U.S.C. 154(b) by 40 days.

(21) Appl. No.: 11/660,780

(22) PCT Filed: Aug. 22, 2005

(86) PCT No.: PCT/CH2005/000489
§ 371 (c)(1),
(2), (4) Date: Apr. 9, 2007

(87) PCT Pub. No.: WO2006/021118
PCT Pub. Date: Mar. 2, 2006

(65) Prior Publication Data
US 2008/0019882 A1    Jan. 24, 2008

(30) Foreign Application Priority Data
Aug. 25, 2004 (DE) .................. 10 2004 041 366
Apr. 7, 2005 (DE) .................. 10 2005 016 146

(51) Int. Cl.
*C08G 63/00* (2006.01)

(52) U.S. Cl. .............. 528/308.2; 528/271; 528/272; 528/308.1; 528/308.3; 528/480; 95/149; 95/159; 95/161; 95/170; 95/171

(58) Field of Classification Search ............... 528/272, 528/274, 480, 271; 521/48.5; 95/149, 159, 95/161, 170, 171; 425/130, 205, 129, 131; 422/129, 131
See application file for complete search history.

(56) References Cited

U.S. PATENT DOCUMENTS

| | | | |
|---|---|---|---|
| 3,657,388 A | 4/1972 | Schweizer | |
| 4,064,112 A * | 12/1977 | Rothe et al. | 528/272 |
| 4,330,661 A | 5/1982 | Go | |
| 5,362,844 A | 11/1994 | Kerpes | |
| 6,048,957 A | 4/2000 | Ekart | |
| 6,312,503 B1 * | 11/2001 | Fike et al. | 95/211 |

FOREIGN PATENT DOCUMENTS

| | | |
|---|---|---|
| EP | 0 222 714 | 5/1987 |
| EP | 0 717 061 | 6/1996 |
| EP | 0 819 716 A2 | 1/1998 |
| EP | 0 836 921 A2 | 4/1998 |
| EP | 0 943 649 | 9/1999 |
| EP | 1 013 691 | 6/2000 |
| WO | WO 2004/101140 A1 | 11/2004 |

\* cited by examiner

*Primary Examiner*—Ling-Siu Choi
*Assistant Examiner*—Frances Tischler
(74) *Attorney, Agent, or Firm*—Francis C. Hand; Carella, Byrne, Cecchi

(57) ABSTRACT

The invention relates to a method for producing a high-molecular polycondensate from a solidified polycondensate prepolymer by solid phase polycondensation. According to said method, the polycondensation cleavage products of the solid phase polycondensation reaction are extracted from the product by means of a process gas, and the process gas is then cleaned of the polycondensation cleavage products and essentially recycled. According to the invention, the specific energy input is less than 120 kWh/t, preferably less than 110 kWh/t and especially between 70 and 100 kWh/t. The invention also relates to an installation for producing a high-molecular polycondensate, said installation comprising a heating appliance (1), followed by a crystallisation appliance (2), a reaction appliance (4), and a cooling appliance (5). A gas outlet (5*d*) of the cooling appliance (5) is connected to a gas inlet (1*c*) of the heating appliance (1), a gas outlet (4*d*) of the reaction appliance (4) is connected to a gas inlet (6*c*) in a gas cleaning system (6), and a gas outlet (6*d*) of the gas cleaning system (6) is connected to a gas inlet (4*c*) of the reaction appliance (4).

27 Claims, 2 Drawing Sheets

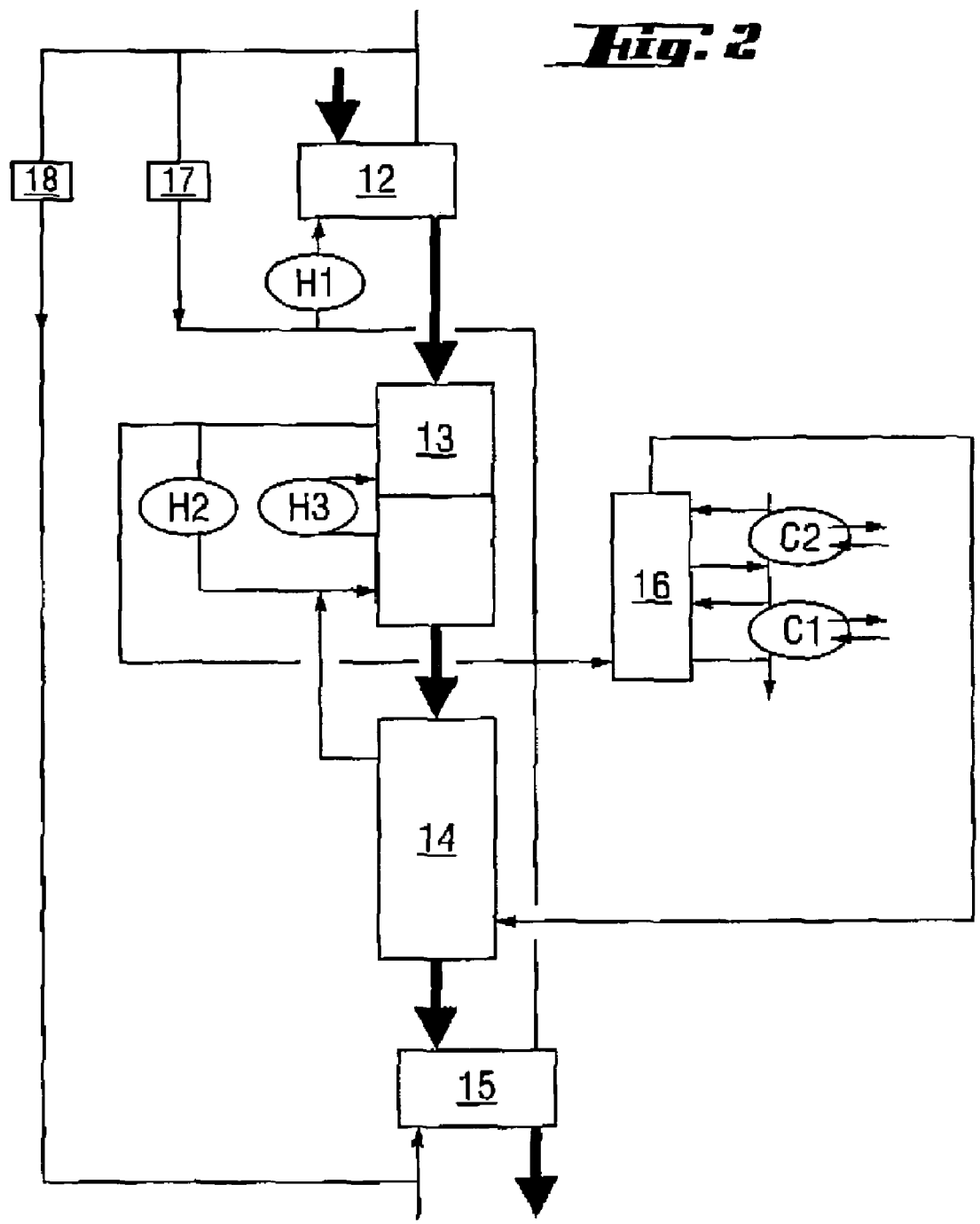

PRODUCTION OF A HIGH-MOLECULAR POLYCONDENSATE

The invention relates to a method for manufacturing a high-molecular polycondensate out of a solidified polycondensate polymer through solid-phase polycondensation, wherein the polycondensation cleavage products obtained via the solid-phase polycondensation reaction are removed from the product by means of a process gas, and the process gas is then stripped from the polycondensation cleavage product and essentially recycled.

The invention also relates to a system for manufacturing a high-molecular polycondensate, consisting of at least one heating unit, followed by at least one crystallization unit, a reaction unit and a cooling unit, wherein at least the cooling unit, reaction unit and heating unit each have product inlet openings and product outlet openings, as well as gas inlet openings and gas outlet openings.

Methods for manufacturing high-molecular polycondensates using a step involving solid-phase polycondensation are known in prior art. Solid-phase polycondensation usually takes place after a liquid-phase condensation, solid-phase polycondensation is usually followed by melting in order to process the polycondensates. Since broad thermal cycles run their course in all of these procedural steps, the energy efficiency of the chain for manufacturing products out of polycondensates is rather poor.

There are various approaches for improving the energy efficiency of the described process chain:

One way is to transfer the process energy from liquid-phase condensation to solid-phase polycondensation.

Such a method is described, for example, in WO 01/12698 A 1. However, the disadvantage here is that the processing step of liquid-phase condensation and the processing step of solid-phase polycondensation must be coupled.

Another way is to transfer the process energy from solid-phase polycondensation to the ensuing fabrication process. One example involves processing post-condensed, warm and dry polyethylene terephthalate through direct injection molding. However, the disadvantage here is that the processing step of solid-phase polycondensation and the fabrication process must be coupled.

U.S. Pat. No. 5,362,844 Kerpes et al. describes a method for reducing acetaldehyde, in which a polyester is pretreated for several hours at a temperature below a softening point lying below the glass transition temperature. While the possibility of saving energy by using process waste heat in the pretreatment step is mentioned, it is limited, since the low processing temperature provides little opportunity for making efficient use of the waste gas streams from a post-condensation system, which arise at a distinctly higher temperature level. Energy savings are correspondingly low.

Another disadvantage is the long treatment time, which causes an energy-intensive compression of the used process gas when heating takes place in the retention time unit, or necessitates the utilization of several units or unit stages for separate heating and treatment. Also disadvantageous is the required low dew point in the ensuing crystallization stage, which increases the process energy.

The object of this invention is to achieve improved energy efficiency for polycondensate product manufacturing chain, without having to create a dependence between the individual processing steps along the way.

The object is achieved by providing an independent solid-phase polycondensation method with a very low specific energy input.

The invention provides a method for manufacturing a high-molecular polycondensate out of a solidified polycondensate polymer through solid-phase polycondensation, wherein the specific energy input measures less than 120 kWh/t, most preferably less than 110 kWh/t, and in particular between 70 and 100 kWh/t.

This is achieved by taking the energy contents in the product that have to be removed toward the end of the process to reduce the necessity of heating product streams or other heat-carrier streams in the process.

This energy transfer occurs in a separate heating step using the waste air from a subsequent process step.

This energy transfer may also occur via crystallization using the waste air from a subsequent process step.

Polycondensate

The polycondensate is a crystallizable, thermoplastic polycondensate, e.g., polyamide, polyester, polycarbonate or polylactide, which is obtained in a polycondensation reaction accompanied by the cleavage of a low-molecular reaction product. Polycondensation can here take place directly between the monomers or via an intermediate stage, which subsequently is converted via transesterification, wherein transesterification is in turn accompanied by the cleavage of a low-molecular reaction product or take place via ring opening polymerization. The polycondensate obtained in this way is essentially linear, wherein a low number of branchings can come about.

The polyamide is here a polymer obtained via polycondensation from its monomers, either a diamine component and a dicarbonic acid component or a bifunctional monomer with an amino and carbonic acid end group, wherein the reaction can also take place via ring opening polymerization, e.g., using lactames.

The polyester is here a polymer obtained through polycondensation from its monomer, a diol component and a dicarbonic acid component. Various, mostly linear or cyclic diol components are used. Different, mostly aromatic dicarbonic acid components can also be used. The dicarbonic acid can also be replaced by its corresponding dimethyl ester.

Typical examples for polyester include polyethylene terephthalate (PET), polybutylene terephthalate (PBT) and polyethylene naphthalate (PEN), which can be used either as homopolymers or copolymers.

The polycondensate can be a new material or recycled material.

Additives can be mixed in with the polyethyl condensate. Suitable additives include catalysts, dyes and pigments, UV blockers, fabrication aids, stabilizers, impact modifiers, chemical and physical foaming agents, fillers like nucleation aids, barriers or particles that improve mechanical properties, reinforcing units, such as balls or fibers, along with reactive substances, such as oxygen absorbers, acetaldehyde absorbers or molecular weight-increasing substances, etc.

Polyethylene Terephthalate

The polyethylene terephthalate is a crystallizable, thermoplastic polyester obtained in a polycondensation reaction accompanied by the cleavage of low-molecular reaction products. Polycondensation can here take place directly between the monomers or via an intermediate stage, which subsequently is converted via transesterification, wherein transesterification is in turn accompanied by the cleavage of a low-molecular reaction product. The polyester obtained in this way is essentially linear, wherein a low number of branchings can come about.

The polyethylene terephthalate is obtained from its monomers, a diol component and a dicarbonic acid component, herein the diol components largely consist of ethylene glycol (1,2 ethane diol), and the dicarbonic acid components largely consist of terephthalic acid. Possible comonomers include other linear, cyclic or aromatic diol and dicarbonic acid bonds. Typical comonomers include diethylene glycol (DEG), isophthalic acid (IPA) or 1,4-bis-hydroxymethyl cyclohexane (CHDM).

Polycondensate Prepolymer

In a first step, the monomers are polymerized or polycondensed in a liquid phase into a prepolymer. The polycondensate prepolymer melt obtained in this way is usually manufactured in a continuous process.

The manufacture of a polyester prepolymer melt usually involves an initial esterification stage followed by a pre-polycondensation stage. In the conventional polyester manufacturing process, this is followed by a polycondensation stage in a high-viscosity reactor (also called finisher) (e.g., compare: Modern Polyesters, Wiley Series in Polymer Science, Edited by John Scheirs, J. Wiley & Sons Ltd., 2003; Ch. 4.2). Polyester manufacture can also take place in a batch process (e.g., compare: Modern Polyesters, Wiley Series in Polymer Science, Edited by John Scheirs, J. Wiley & Sons Ltd., 2003; Ch. 4.1).

As an alternative, the aforementioned polycondensation stage in the high-viscosity reactor can be omitted. This yields a low-viscous polyester prepolymer with a degree of polymerization (DP) lying clearly below the degree of polymerization for the polyester following the ensuing solid-phase treatment. The degree of polymerization for the low-viscous prepolymer usually measures below 60%, in particular below 50% of the degree of polymerization for the polyester postcondensed in the solid phase.

Another alternative involves using already polycondensed polyesters, which are present in their raw form as bottle shreds, or in a homogenized state produced via melting. An already polycondensed polyester can also be brought to a suitable viscosity level via melting and depolymerization.

Granulation

The polycondensate polymer melt is usually solidified via granulation, although alternative solidification methods can be used to generate solid prepolymer particles, such sintering threads, cutting film or milling cooled pieces.

During granulation, the prepolymer melt is converted into a defined shape and solidified. The prepolymer melt is here pressed through a die having one opening or multiple openings and cut or dripped.

The die openings are usually round, but can have another profile, e.g., slotted. Cutting can take place both directly at the die outlet, or only after a treatment path has been traversed.

Cooling solidifies the prepolymer melt. This can take place using a liquid cooling medium (e.g., water, ethylene glycol) or gaseous cooling medium (e.g., air, nitrogen, water vapor), or through contact with a cold surface, wherein combinations of cooling media are also conceivable.

Cooling can take place both simultaneously or before or after the process of molding in to particles.

If a prepolymer melt is from a conventional polyester manufacturing process, granulation processes like strand granulation, water ring granulation, underwater granulation or head granulation (also called hot face granulation) are usually employed.

If a low-viscous prepolymer melt is present, granulation processes like dripping, water ring granulation, underwater granulation or head granulation (also hot face granulation) is used.

The average granule size usually measures between 0.4 mm and 10 mm, preferably between 0.7 mm and 3 mm. The average granule size is equal to the statistical average of the average granule diameter found from the average for granule height, length and width.

The granules can have a defined granule form, e.g., cylindrical, spherical, drop-shaped, sphere-like, or a design of the kind proposed in EP 0541674, for example, or have an irregular grainy product shape of the kind produced in a grinding or breaking process.

Use can be made of solid granules or porous granules, e.g., obtained via sintering, foaming and the like.

Solid-Phase Polycondensation

Solid-phase polycondensation encompasses all procedural steps necessary to manufacture a high-molecular polycondensate out of the solidified pre-polycondensate in the solid phase. This includes steps for heating, crystallization, reaction and cooling. Other treatment stems can be incorporated, e.g., treatment with additives.

The procedural steps take place in the respective devices suitable for the step. However, several procedural steps can be performed in a single device at the same time or in several stages. In like manner, several devices can be used for a single procedural step.

According to the invention, the polycondensate prepolymer is supplied to the process "cold", e.g., in the state present after stored in a silo, container or small vessel. This means that it is not guided in the process while maintaining a significant percentage of the heat content from a preceding procedural stage. Therefore, the polycondensate prepolymer is supplied to the process at an ambient temperature of under 40° C., in particular of between −20 and 25° C.

During solid-phase polycondensation, the product temperature is increased by at least 160° C., in particular by at least 180° C., as a result of which the product temperature is raised to at least 185° C., in particular at least to 205° C.

Since the energy efficiency of a process can be increased with rising throughput, a preferred embodiment of the invention provides that solid-phase polycondensation takes place continuously, and the product throughput measures at least 30 t/day, in particular at least 300 t/day.

Despite the energy advantages that result by arranging all process steps one over the other and having gravity move the product from one process stage to the next, it is advantageous in systems with high throughputs to initially raise the polycondensate to a higher level with a conveyor during the process, so as to limit the overall height of the system.

Crystallization

The crystallization level of the prepolymer granules is raised according to the methods known in prior art. Crystallization normally takes place thermally, giving rise to a thermally partially crystallized polyethylene terephthalate. However, solvent-induced crystallization and crystallization via mechanical stretching are also conceivable, albeit less suitable.

Crystallization can take place in several stages, both before, during and after the granulation step. To this end, the prepolymer granules must be treated at a suitable crystallization temperature.

During crystallization, the objective is to achieve at least one crystallization level that permits treatment in the ensuing solid-phase polycondensation, without resulting in conglutinations or clump formations.

The suitable temperature range becomes evident by recording the crystallization half-life period ($t_{1/2}$) measured in the DSC as a function of temperature. It is bound top and bottom by the temperature at which the crystallization half-life period reaches roughly 10 times the minimal crystallization half-life period $t_{1/2min}$. Since very short crystallization half-life periods ($t_{1/2}$) can only be determined with difficulty, $t_{1/2min}=1$ minute is taken as the minimal value.

For polyethylene terephthalate, the temperature range lies between 100 and 220° C., and a crystallization level of at least 20%, preferably of at least 30%, is achieved.

According to the invention, the temperature of the prepolymer granules after the granulation step lies below the suitable crystallization temperature. Therefore, the prepolymer granules must be heated. This can be accomplished, for example, via a heated wall of the crystallization reactor, heated built-in elements in the crystallization reactor, radiation or via injection of a hot process gas.

The suitable crystallization time is calculated from the time needed to heat the product to crystallization temperature plus at least the crystallization half-life period at the given temperature, wherein preferably 2-20 half-life periods are added to the heating time in order to achieve a sufficient crystallization.

In order to prevent the crystallizing prepolymer granules from conglutinating, the latter must be kept in motion relative to each other. This can be accomplished, for example, by using an agitating mill, a moving container or through exposure to a fluidization gas.

Particularly suitable crystallization reactors include fixed bed or fluidized bed crystallizers, since these tend not to exhibit dust formation.

As the crystallization level increases, any residues of liquid are removed from the granulation process.

If a process gas is circulated in the crystallization process, enough fresh gas or purified process gas must be added to the latter to prevent excessive liquid enrichment. The process gases used for solid-phase polycondensation can also be used in the crystallization step, wherein various process gases can also be used in the varying process stages.

In one embodiment of this invention, the polycondensate is heated prior to crystallization, which takes place using a process gas stream from a step in the further progression of solid-phase polycondensation.

Particularly suitable to this end is a process gas stream from a step for cooling the polycondensate, with a process gas stream from a step that takes place under air being especially preferred.

The polycondensate is to be heated to a temperature Tv that exceeds 50° C., in particular exceeds 75° C., wherein Tv preferably lies within a range of Tg −30° C. to Tg +30° C., in particular within a range of Tg to Tg +20° C., wherein Tg denotes the glass transition temperature of the polycondensate.

Heating can take place in any reactor. Preference goes to a device in which the product is moved, e.g., an agitated or moving reactor, a fixed bed device or a fluidized bed device.

Especially preferred is a device that can be operated at different gas throughput quantities and an mg/mp ratio >2, so that the product outlet temperature can be controlled from the heating step, even given fluctuations in the temperature of the process gas stream from a step in the further progression of solid-phase polycondensation via the gas flow quantity.

Heating preferably takes place at an average retention time of within a few minutes to a maximum of one hour, but can also occur in a supply vessel at a longer retention time if Tv does not exceed one hour, in particular 20 minutes.

The polycondensate is heated concurrently with drying the polycondensate, provided it is still interacting with moisture or another volatile substance. This makes it possible to reduce volatile substances in subsequent procedural steps, thereby decreasing the contamination level of the accompanying process gas streams, thereby permitting a reduction in the quantity of gas that must be cleaned. In particular, a polycondensate moistened during granulation is dried. To this end, the process gas quantity and temperature are selected in such a way that the polycondensate is dried to a moisture content of between 50 ppm water and 2000 ppm water, in particular of between 200 ppm water and 1000 ppm water.

In another embodiment of this invention, the polycondensate is heated during crystallization, which is accomplished using a process gas stream from a step further on in the course of solid-phase polycondensation.

Particularly suitable for this purpose is a process gas stream from a step for cooling the polycondensate. A process gas stream from a step performed under air is especially preferred.

Crystallization requires that the polycondensate be heated to a temperature Tc, wherein Tc lies within a temperature range where the crystallization half-life period of the polycondensate measures less than ten times the minimal crystallization half-life period ($t_{1/2min}$) of the polycondensate. One minute is here used as the minimal value for $t_{1/2min}$. For polyethylene terephthalate, Tc usually ranges from 100° C. to 220° C., in particular from 120° C. to 200° C., wherein a narrower temperature range arises given an increasing comonomer content.

Heating can take place in any crystallization reactor desired. Preference goes to a device in which the product is moved, e.g., an agitated or moving reactor, a fixed bed device or a fluidized bed device.

Solid-Phase Polycondensation Reaction

The molecular weight of the polycondensate granules is brought to a higher polymerization level via a solid-phase polycondensation reaction accompanied by the cleavage of polycondensation cleavage products.

Given a prepolymer melt granule from a conventional manufacturing process, the polymerization level is usually elevated by between 10% and 70%, wherein a rise of at least 0.15 dl/g is preferred.

Given a low-viscous prepolymer melt granule, the polymerization level is increased to at least 1.67 times, in particular at least 2 times the prepolymer.

The solid-phase polycondensation reaction is executed according to the method known from prior art, taking place at least in the heating stage at a suitable post-condensation temperature and during the post-condensation reaction. Essentially continuous processes are here used, e.g., taking place in devices such as fluidized bed, solids-air jet bed or solid bed reactors, as well as in reactors with agitating implements or self-moving reactors, such as cylindrical rotating kilns. The solid-phase polycondensation reaction can take place both at normal pressure, at elevated pressure, or under a vacuum.

According to the invention, the polycondensation cleavage products are removed from the solid phase polycondensation reaction by means of a process gas (carrier gas). In continuous processes with process gas, the process gas here flows around the polycondensate in co-currently, counter-currently, or cross-currently. The carrier gas quantity must be sufficient to carry the reaction products that diffused on the surface of the particles and any contaminants, such as carbonyl compounds from the manufacturing process or contaminants from previous usage, out of the reaction step.

If the heating step involves exposure to a process gas, a high specific gas quantity (mg/mp=2 to 20, in particular 5 to 13) is used, so that the temperature of the product essentially approximates the temperature of the gas.

If the heating step involves introducing other forms of energy, for example via a heated surface, or radiation, it still is advantageous to have a process gas stream through the product or apply a vacuum.

The post-condensation reaction step can occur at a low specific gas quantity (mg/mp=0.1 to 1.5, in particular 0.3 to 1.0), causing the temperature of the gas to essentially approximate the temperature of the product, thereby making it possible to supply the process gas to the process with a temperature below the post-condensation temperature.

In this case, mp is the sum of the mass of all product streams supplied to the process, and mg is the sum of the masses of all gas streams supplied to the process. The process gases are circulated by gas compressors, e.g., fans, ventilators or compressors.

Possible process gases include air or inert gases, such as nitrogen or $CO_2$, along with mixtures of process gases. The process gases can contain additives that either reactively affect the product to be treated, or become passively deposited on the product to be treated.

According to the invention, the process gas is at least partially circulated.

In order to lessen impairment to the polycondensation reaction, the process gas is cleaned to remove undesired products, in particular cleavage products from the polycondensation reaction. Cleavage products like water, ethylene glycol, methyl dioxolane or aldehydes (e.g., acetaldehyde) are here to be reduced to values of below 100 ppm, in particular to values of below 10 ppm. To achieve equilibrium, it may be necessary to leave a residual quantity of reaction products in the process gas.

Cleaning can take place using gas cleaning systems known in the art, such as combustion systems (catalytic combustion systems), gas scrubbers, adsorption systems or cold traps. One special embodiment of this invention provides that the process gas is cleaned by means of a scrubbing liquid, and that the scrubbing liquid is subsequently used in a procedural step in prepolymer manufacture. The process gas can here be cleaned in one or more stages, wherein the scrubbing liquid runs through the respective stages only once, or is circulated, with the overflow being directed to prepolymer manufacture. For example, ethylene glycol can be used as the scrubbing liquid for manufacturing polyethylene terephthalate.

The suitable post-condensation temperature ranges from 185° C. to 240° C., wherein temperatures of under 220° C. are preferred.

The suitable post-condensation time ranges from 2 to 100 hours, wherein 6 to 30 hours is preferred for economic reasons.

As an option, the crystallization step and the step of heating to a suitable post-condensation temperature can take place simultaneously, or at least in the same reactor, wherein the reactor used for this purpose can be separated into several processing chambers, in which various processing conditions can prevail (e.g., temperature and retention time).

Specific Energy Input

The specific energy input is the sum of all thermal and mechanical energy supplied to the process in relation to the processed product quantity.

The process boundaries range from the product inlet into the process before the first treatment step to the product outlet from the process after the last treatment step, wherein the product enters into the product at an ambient temperature, i.e., a maximum of 40° C., normally 0 to 25° C. Any step for preheating the product is hence a part of the process. The process encompasses all procedural steps in which the product is treated. The process also encompasses all gas streams or liquid streams that are used for the direct or indirect input of energy into the product.

Therefore, the process includes procedural steps in which the product is heated, crystallized, agitated, treated with carrier gas or under a vacuum, moved, mixed or conveyed.

A procedural step in which the product is heated by a hot surface hence includes the energy required to heat the surface. If the surface is heated by a fluid, consideration is given to the energy inputs for circulating the fluid and heat the fluid.

A procedural step in which the product is treated via radiation, in particular heated, hence includes the energy required to generate the radiation, e.g., microwave radiation or infrared radiation.

A procedural step in which the product is moved hence includes the energy with which the product is moved, e.g., drives for agitators, sluices or screw conveyors, or drives for moving a treatment unit or part of a treatment unit, such as rotary kilns or vibrating screens.

Also taken into account are energy inputs for circulating and possibly heating a liquid used to move the product, e.g., process gases, which are used in fluidized bed or solid-air bed units or in pneumatic conveying devices.

A procedural step in which the product is treated with a fluid, e.g., a process gas, hence includes the energy carriers required to circulate and, if necessary, heat the fluid. IF the fluid is circulated or at least partially circulated, consideration is given to the energy inputs required for cleaning the fluid.

Energy inputs required for cleaning the fluid encompass energy inputs needed, for example, to circulate a scrubbing liquid, regenerate an adsorption device or implement a combustion process.

Energy inputs for generating and circulating the energy carriers (=utilities) are not taken into account if these are not released directly to the process.

Energy carriers include electrical current, cooling water, compressed air, heat carriers, such as vapor or heat carrier oils or process gases, such as nitrogen, $CO_2$, or special gas mixtures.

Examples for Items not Taken into Account:
Energy inputs for circulating cooling water or ice water, with which a process gas stream is indirectly cooled.
Energy inputs for generating cooling water or ice water.
Energy inputs for generating compressed air for process control.
Energy inputs for generating nitrogen or other process gases.
Energy inputs for circulating heat carriers with which a process gas stream is indirectly heated, and
Energy inputs for generating or distributing electrical current.

Also not taken into account are energy inputs for preparing wastewater streams or scrubbing liquids.

BRIEF DESCRIPTION OF THE DRAWINGS

FIG. 2 illustrates a modified plant for manufacturing a high molecular polycondensate in accordance with the invention.

METHODS

Figure 1:
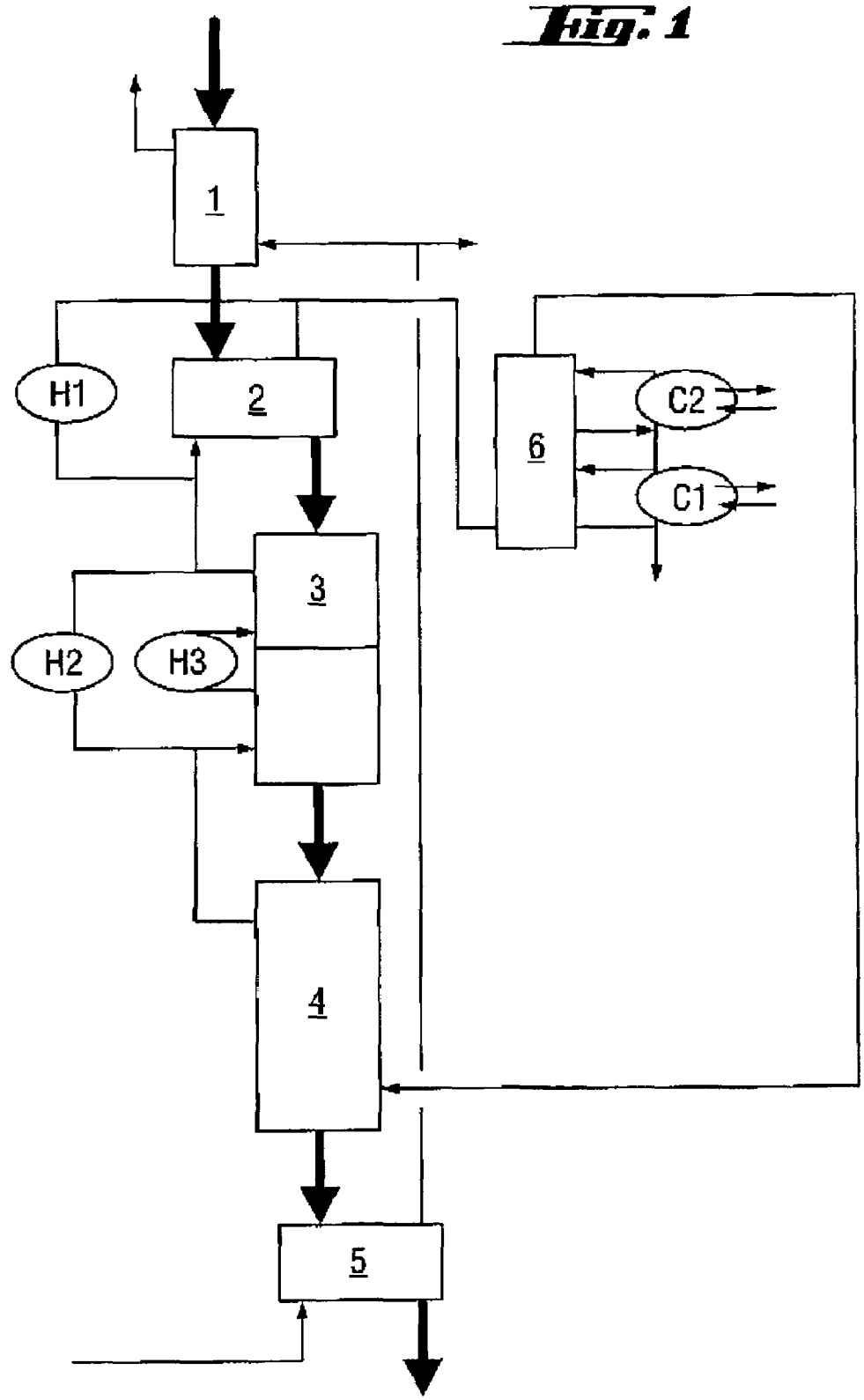
FIG. 1 illustrates a schematic of a plant for manufacturing a high molecular polycondensate in accordance with the invention.

In the implementation according to FIG. 1, an essentially amorphous polycondensate prepolymer is continuously treated in a heating unit (1), followed by a crystallization unit (2), another heating unit (3), a reaction unit (4) and a cooling unit (5). The crystallization unit, additional heating unit and reaction unit have an allocated, essentially closed process gas circulation. Air is used as the process gas in the heating unit and cooling unit. An inert gas is used as the process gas in the crystallization unit, other heating unit and reaction unit, of which a portion is cleaned in a gas scrubber (6). The gas scrubber can be designed in several stages, in which different or differently heated scrubbing liquids flow/circulate, of which two with the respectively accompanying coolers (C1, C2) are shown here. As an option, additional cleaning stages can take place, e.g., with the use of cyclones, filters, demisters (drop separators) or adsorbers.

The inert gas is added in sufficient quantity to offset losses incurred via the material supply line into the inert gas area and material discharge line from the inert gas area, as well as via any other loss points. In order to minimize inert gas loss, material supply and discharge take place by means of a sluice, in particular by means of a cell wheel sluice.

As an option, sluices can also be situated between units inside the inert gas area or outside the inert gas area.

The process gases are circulated by means of a gas compressor, e.g., fans, ventilators or compressors.

In one embodiment of the invention, a gas outlet opening of the cooling unit is connected with a gas inlet opening of the first heating unit, so that at least a portion of the process gas heated in the cooling process can release its energy to the cold product entering into the process. Optionally used valves can be used to set or regulate the process gas quantity for the heating step.

The process air is supplied to the process, in particular the cooler, via a suction filter.

The process gas is heated by means of heat exchangers (H1 to H3) in at least the crystallization circulation and circulation of the other heating unit, so as to heat up the polycondensate in this way. Heating can here take place in several stages, of which only three are shown.

In one subclaim of this invention, the scrubbing liquid from the gas scrubber is used in a reaction stage of the polycondensate prepolymer manufacturing process, wherein it can first pass through a cleaning stage, e.g., a distillation column.

One option provides that the gas be purified via catalytic post-combustion, wherein the bulk of the additional heating energy is recovered by means of a heat exchanger.

Another option provides that the polycondensate be transferred from one unit to the next by one or more conveying devices, e.g., a pneumatic conveyor.

The options described above increase the energy input by a respective small quantity, while remaining within the prescribed limits.

Another option provides that the crystallization step(s) take(s) place under air.

This option makes it possible to also connect the supply opening for fresh gas in the crystallization circulation with the gas outlet opening of the cooler, so that a further energy savings can be realized.

The embodiment according to FIG. 2 is essentially based on the embodiment according to FIG. 1, the difference being that the process heat from the cooling unit is directly used to heat the product in the crystallization unit. The embodiment provides that an essentially amorphous polycondensate prepolymer is continuously treated in a crystallization unit (12), followed by another heating unit (13), a reaction unit (14) and a cooling unit (15). The other heating unit and the reaction unit have an allocated, essentially closed process gas circulation. Air is used as the process gas in the crystallization unit and cooling unit. An inert gas is used as the process gas in the other heating unit and in the reaction unit, of which a portion is cleaned in a gas scrubber (16).

In an embodiment of the invention, one gas outlet opening of the cooling unit is connected with a gas inlet opening of the crystallization unit, so that at least a portion of the process gas heated in the cooling process can release its energy to the cold product entering into the process. The entire process gas is most preferably routed out of the cooling unit into the crystallization unit. As an option, the gas quantity flowing through the crystallization unit can be increased by supplying additional process gas from outside via another unit, e.g., shown by line (17), by generating a circulation. As another option, a circulation can be generated between the cooling unit and crystallization unit, e.g., as shown by line (18).

The process air is most preferably supplied to the cooler or the exchange gas is most preferably supplied to the crystallizer or cooler-crystallizer circulation via a suction filter.

Additional advantages, features and possible applications of the invention may be gleaned form the following description of examples according to the invention based on the drawing, which are not to be regarded as limiting.

Example 1

A granulated polyethylene terephthalate is supplied to a process according to FIG. 1 consisting of units 1, 2, 3, 4, 5, 6, H1, H2, H3, C1 and C2 with an inlet temperature of 10° C. The throughput measures 22.9 tons per hour.

The product is heated to 72° C. in the heating unit 1, through which 90% of the air from the cooler flows.

In the crystallization unit 2, the product is further heated to 186° C., and the crystallinity is increased to 38%

In the heating unit 3, the product is further heated to 213° C. in sex stages, and the crystallinity is increased to 45%.

In the reaction unit or reactor (4), the intrinsic viscosity is increased from 0.62 to 0.82.

In the circulation for the crystallization unit 2, 124 tons per hour of nitrogen are circulated and continuously warmed to 200° C.

In the circulation for the heating unit 3, 11 tons per hour of nitrogen are continuously circulated in six stages. This yields an mg/mp of approx. 3:1. The nitrogen is heated to a respective temperature of between 215° C. and 225° C., and passed through the product.

10 tons per hour of purified nitrogen are supplied to the reactor, and continuously heated to 80° C.

Cooling takes place with 54 tons per hour of air.

The nitrogen is cleaned by means of a 3-stage gas scrubber operated with cooled ethylene glycol as the scrubbing liquid.

7 tons per hour and 35 tons per hour and 40 tons per hour of scrubbing liquid are circulated in the gas scrubber.

A respective sluice is employed in front of the units 1, 2, 3 and 5, as well as after the cooling unit 5.

1 ton of process gas per hour heated to 220° C. is pneumatically conveyed between units 3 and 4.

A total of 48 kWh/t of energy for motors and 45 kWh/t of energy for heaters are supplied to the process, which corresponds to an overall consumption of 93 kWh/ton.

Heat losses from the units as well as product and process gas lines are here included in the calculation. All units are insulated to keep their surface temperature below 50° C.

Example 2

In this comparative example, the system from example 1 is operated without unit 1 and with a gas scrubbing system, which executes catalytic combustion at 350° C., followed by an adsorption dryer. A gas scrubber is not used, and the cooling air from unit 5 is not used in the process.

A total of 43 kWh/t of energy for motors and 83 kWh/t of energy for heaters are supplied to the process, which corresponds to an overall consumption of 126 kWh/ton.

The invention claimed is:

1. A method for manufacturing a high-molecular polycondensate out of a solidified polycondensate prepolymer through solid-phase polycondensation, comprising at least one step for heating up the polycondensate, followed by at least one step for crystallization, at least one step for solid-phase polycondensation reaction and at least one step for cooling, wherein said step for heating and at least one of said steps for cooling involve exposure to a first process gas, characterized in that a gas outlet opening of a cooling unit is connected with a gas inlet opening of a heating unit, so that at least a portion of the first process gas heated in the cooling process releases its energy to the cold product entering the process in the step of heating before crystallization, wherein the polycondensation cleavage products obtained via the solid-phase polycondensation reaction are removed from the product by means of a second process gas, and the second process gas is then stripped from the polycondensation cleavage product and essentially recycled in an essentially closed process gas circulation at least through said step for solid-phase polycondensation reaction, wherein the polycondensate prepolymer is supplied to the process at an ambient temperature under 40° C. and the product temperature increases by at least 160° C. wherein the specific energy input measures less than 120 kWh/ton.

2. The method according to claim 1, further characterized in having at least one of the following features:

The polycondensate prepolymer is supplied to the process in essentially an amorphous state;

The crystallinity increased by at least 20%;

The product temperature is increased to at least 185° C.;

The product throughput measures at least 30 ton/day;

The first process gas is air;

The second process gas is an inert gas selected from the group consisting of nitrogen and $CO_2$;

The polycondensate is raised to a higher level at least once by means of a conveying device during the course of the process.

3. The method according to any one of claims 1 and 2, characterized in that the polycondensate is selected from the group consisting of polyethylene terephthalate (PET), polybutylene terephthalate (PBT) and polyethylene naphthalate (PEN) and copolymers thereof.

4. The method according to any one of claims 1 and 2, characterized in that the second process gas quantity that is scrubbed ranges between 0.1 and 1.5 relative to the product quantity.

5. The method according to any one of claims 1 and 2, characterized in that each step of crystallization and solid-phase polycondensation reaction (SSP reaction) has an allocated second process gas stream.

6. The method according to claim 5, characterized in that the second process gas streams are interconnected, end that the second process gas is scrubbed of volatile substances that transfer from the product to the process gas in the crystallization circulation.

7. The method according to claim 6, characterized in that additional steps are involved for product heating, product drying, the SSP reaction or product cooling.

8. The method according to any one of claims 1 and 2, characterized in that the process gas from the cooling is used to heat up the polycondensate in the step of heating before crystallization.

9. The method according to claim 5, characterized in that a first crystallization step is preceded by a step for heating the polycondensate to a temperature Tv greater than 50° C.

10. The method according to claim 9 characterized in that said temperature Tv ranges from Tg −30° C. to Tg +30° C., wherein Tg denotes the glass transition point.

11. The method according to one claims 1 and 2, characterized in that the heating step takes place in a fixed-bed or fluidized-bed unit.

12. The method according to one of claims 1 and 2, characterized in that the heating step is accompanied by a drying of the polycondensate to a moisture content of between 50 ppm of water and 2,000 ppm of water.

13. The method according to any one of claims 1 and 2 wherein at least one step for crystallization and one other step involving exposure to a process gas take place, characterized in that at least a portion of the process gas from said other step is used to heat up the polycondensate in the crystallization step.

14. The method according to claim 13, characterized in that the first process gas from a cooling step is used to heat the polycondensate in the crystallization step.

15. The method according to any one of claims 1 and 2, characterized in that the polycondensate is heated to a temperature Tc in the crystallization step in a temperature range in which the crystallization half-life period of the polycondensate measures less than 10 times the minimal crystallization half-life period ($t_{1/2min}$) of the polycondensate, wherein 1 minute is used as the minimal value 1 for $t_{1/2min}$.

16. The method according to claim 15, characterized in that said temperature Tc ranges from 100° C. to 220° C.

17. The method according to any one of claims 1 and 2, characterized in that the process gas is scrubbed by means of a scrubbing liquid, selected from the group consisting of ethylene glycol, butylene glycol and water.

18. The method according to claim 17, characterized in that the scrubbing liquid is subsequently used in a procedural step for prepolymer manufacture.

19. The method according to claim 17, characterized in that the scrubbing liquid is subsequently used in a procedural step to prepare used polycondensates.

20. The method according to claim 17 characterized in that the specific energy input measures less than 110 kWh/ton.

21. A method for manufacturing a high-molecular polycondensate out of a solidified polycondensate prepolymer through solid-phase polycondensation, said method comprising the steps of supplying a polycondensate prepolymer at an ambient temperature under 40° C.;

heating the polycondensate prepolymer temperature by at least 160° C. with a first process gas;

crystallizing the heated polycondensate prepolymer;

subjecting the crystallized polycondensate prepolymer to another heating step and to a solid-phase polycondensation reaction to obtain a polycondensate and polycondensation cleavage products;

cooling the polycondensate with the first process gas while heating the first process gas;

directing at least a portion of the heated first process gas from said step of cooling to said first step of heating whereby at least a portion of the first process gas heated in said cooling step releases heat energy to the polycondensate prepolymer entering said first step of heating before crystallization thereof, removing the polycondensation cleavage products from the polycondensate with a second process gas different from the first process gas, and stripping the second process gas from the polycondensation cleavage products and recycling the second process gas in an essentially closed process gas circulation at least through said step of solid-phase polycondensation reaction.

22. The method according to claim 21 further characterized in that the first process gas is air and in that the second process gas is an inert gas selected from the group consisting of nitrogen and $CO_2$.

23. A method for manufacturing a high-molecular polycondensate out of a solidified polycondensate prepolymer through solid-phase polycondensation, said method comprising the steps of supplying a polycondensate prepolymer at an ambient temperature under 40° C.;

heating the polycondensate prepolymer temperature by at least 160° C. with a first process gas while crystallizing the heated polycondensate prepolymer;

subjecting the crystallized polycondensate prepolymer to another heating step and to a solid-phase polycondensation reaction to obtain a polycondensate and polycondensation cleavage products;

cooling the polycondensate with the first process gas while heating the first process gas;

directing at least a portion of the heated first process gas from said step of cooling to said step of heating and crystallizing whereby at least a portion of the first process gas heated in said cooling step releases heat energy to the polycondensate prepolymer entering said step of heating and crystallizing, removing the polycondensation cleavage products from the polycondensate with a second process gas different from the first process gas, and stripping the second process gas from the polycondensation cleavage products and recycling the second process gas in an essentially closed process gas circulation at least through said step of solid-phase polycondensation reaction and said another heating step.

24. The method according to claim 23 further characterized in that the first process gas is air and in that the second process gas is an inert gas selected from the group consisting of nitrogen and $CO_2$.

25. The method as set forth in claim 1 wherein said steps are conducted on a continuous basis.

26. The method as set forth in claim 21 wherein said steps are conducted on a continuous basis and the specific energy input of the method measures less than 120 kWh/ton.

27. The method as set forth in claim 23 wherein said steps are conducted on a continuous basis and the specific energy input of the method measures less than 120 kWh/ton.

* * * * *